United States Patent [19]
Iwane

[11] Patent Number: 5,873,006
[45] Date of Patent: Feb. 16, 1999

[54] FOCUSING DEVICE

[75] Inventor: Touru Iwane, Yokohama, Japan

[73] Assignee: Nikon Corporation, Tokyo, Japan

[21] Appl. No.: 869,089

[22] Filed: Jun. 4, 1997

Related U.S. Application Data

[60] Provisional application No. 60/038,293 Feb. 20, 1997.

[30] Foreign Application Priority Data

Jun. 26, 1996 [JP] Japan .................................... 8-165980

[51] Int. Cl.$^6$ ................................................. G03B 13/36
[52] U.S. Cl. ................................................. 396/95
[58] Field of Search ............................... 396/95

[56] References Cited

U.S. PATENT DOCUMENTS 4,908,645  3/1990  Higashihara et al. .................... 396/95

FOREIGN PATENT DOCUMENTS 62-263728  11/1987  Japan .

*Primary Examiner*—W. B. Perkey
*Attorney, Agent, or Firm*—Oliff & Berridge, PLC

[57] ABSTRACT

A focus adjustment apparatus which automatically focuses a camera or other optical equipment. The focus adjustment apparatus predicts complex fluctuations in the image plane position easily and accurately. The apparatus includes a focus detection device which detects a defocus amount, a lens position detection device which detects a lens position of the photographing optical system, and an image plane position computation device. The image plane position computation device computes the image plane position of the object image on the basis of the defocus amount and the lens position. The apparatus further includes an image plane speed computation device. The image plane speed computation device computes the image plane speed on the basis of a change over time in the image plane position. The apparatus also includes a statistical device. The statistical device performs statistical analysis on a sample interval composed of the image plane position and the image plane speed, and determines the undetermined coefficients in a preselected equation of motion. The equation of motion includes the image plane position and image plane speed. The apparatus also includes a predicting device which computes a predicted value of the image plane position on the basis of a solution of the equation of motion. The solution can be a time dependent function. The apparatus also includes a focus control device which controls focus based on the predicted value of the image plane position.

20 Claims, 13 Drawing Sheets

FOCUSING DEVICE

BACKGROUND OF THE INVENTION

1. Field of Invention

This non-provisional application claims the benefit of U.S. Provisional Application No. 60/038,293 filed Feb. 20, 1997, entitled "Focusing Device", by Touru IWANE. The present invention relates to a focus adjustment apparatus which accomplishes automatic adjustment of the focus state in a camera or other optical equipment, and more particularly relates to a focus adjustment camera which easily and accurately predicts the complex motion of the image plane position.

2. Description of Related Art

Conventionally, focus adjustment apparatuses are mounted on optical equipment such as cameras in order to perform automatic focus adjustment of the photographing optical system.

In these focus adjustment apparatuses, the distance between the object image plane and the imaging plane (hereafter, this distance will be referred to as the "defocus amount") is computed using a commonly known phase difference detection method or the like.

The focus adjustment apparatus accomplishes focus adjustment by scrolling the photographing optical system forward and backward in accordance with this defocus amount.

Normally, in this kind of focus adjustment, two operation modes, namely the "single AF mode" and the "continuous AF mode" are used.

That is to say, in the single autofocus (AF) mode, focus adjustment is instantly halted (focus lock) at the point in time when an in-focus determination is made during the focus adjustment period. On the camera side, the photographing operation is started after waiting for this focus lock state. This kind of single AF mode is primarily used in focus-priority photographing.

In contrast, the continuous AF mode continues focus adjustment regardless of an in-focus determination. On the camera side, the photographing operation is executed in conjunction with the operation of a release button by the photographer. This kind of continuous AF mode is primarily used in photography giving priority to shutter opportunities.

However, when the object is moving, the object moves an extra amount during an interval beginning when the release button is completely depressed and ending when the photographing operation is performed (the so-called release time lag), and thus a defocus occurs.

Hence, as one type of the above-described focus adjustment apparatuses, a device has been known which extrapolates the trend of the focus detection information prior to release in the continuous AF mode or the single AF mode and predicts the image plane motion during the release time lag. By performing focus adjustment on the basis of this prediction, it is possible to correct the defocus caused by the release time lag.

Furthermore, the defocus amounts are detected one-by-one via an electric charge accumulation process in the light-receiving element array and a computation process. Consequently, the defocus amounts are data that are detected discretely and time delayed.

This time delay in the data results in useless time (dead time) in the control operation. Consequently, inadequate focus adjustment can easily occur in the subsequent operation of focus adjustment.

Hence, as one type of the above-described focus adjustment apparatuses, a device has been known wherein the image plane position of the current point in time is gradually predicted by extrapolating the trend of the past focus detection information in the continuous AF mode.

By performing focus adjustment continuously in conjunction with this predicted value, inadequate focus adjustment performed in the control operation of focus adjustment is compensated for, making it possible to obtain improved focus adjustment performance.

As described above, accurately predicting the image plane position is extremely important in attempting to improve the performance of focus adjustment.

A method is known for linearly predicting the image plane position (the so-called first-order hold and second-order hold of the discrete value) on the basis of the past data of the image plane position. See, e.g., the disclosure of Japanese Laid-Open Patent Publication 62-263728.

However, in this kind of conventional example, the image plane position is predicted on the basis of the assumption that the image plane speed is a constant or the image plane acceleration is a constant.

Consequently, a problem arises in actual cases, wherein when the image plane speed and image plane acceleration change, it is impossible to predict the image plane position accurately.

In particular, even in the relatively simple motion model where the object moves uniformly on the object space side, the image plane position in a conjugate position moves in a complex manner. Consequently, even for objects having relatively simple motion, it is extremely difficult to accurately predict the motion of the image plane position.

Furthermore, the image plane acceleration is computed from two differences in the image plane position. Consequently, it is easy for phase delays with the image plane position and high-range noise components to adversely affect the prediction of motion of the image plane position. Accordingly, in the conventional prediction method, the problem arises that the accuracy of the predicted value is low, acutely reflecting the effects of detection scattering of the focus detection information.

SUMMARY OF THE INVENTION

The focus adjustment apparatus according to the present invention uses at least one equation of motion to describe and predict image plane positions with a high degree of accuracy as an object moves relative to a lens controlled by the focus adjustment apparatus. The equation of motion initially includes undetermined coefficients.

To determine the coefficients, the focus adjustment apparatus gathers sample data as the object moves relative to the lens. The sample data are statistically analyzed, and the results of the statistical analysis are used to determine the undetermined coefficients in the equation of motion. The determined coefficients are inserted into the equation of motion, and the equation of motion is used to accurately predict the image plane position as the object moves relative to the lens.

Accordingly, it is an objective of the invention to provide a focus adjustment apparatus which can accurately and easily predict complex fluctuations in the image plane position in order to resolve the above-described problems.

It is an objective of the invention to provide a focus adjustment apparatus which can accurately and easily predict fluctuations in the image plane position for objects which approach or recede from a lens controlled by the focus adjustment apparatus at a uniform speed along a path that intersects the position of the lens. Such objects are hereafter referred to as "collision objects". An object that moves along a path that does not intersect the position of the lens is hereafter referred to as a "passing object".

It is an objective of the invention to provide a focus adjustment apparatus which can accurately and easily predict fluctuations in the image plane position for passing objects passing at a uniform speed along a path separated from the focus adjustment apparatus by a predetermined distance.

Different equations of motion can be used, depending on whether the object is a collision object or a passing object. In addition, the object can be initially classified as, or assumed to be, one of a collision object or a passing object, and then later reclassified.

It is an objective of the invention to provide a focus adjustment apparatus which can switch smoothly between a prediction computation for the image plane position for a passing object and a prediction computation for the image plane position for a collision object.

It is an objective of the invention to provide a focus adjustment apparatus which can linearly predict the image plane position with a high degree of accuracy.

A focus adjustment apparatus according to the present invention can include the following:

- a focus detection device that detects a defocus amount;
- a lens position detection device that detects a lens position of the photography optical system;
- an image plane position computation device that computes image plane position of an object image on the basis of a defocus amount and a lens position;
- an image plane speed computation device that computes an image plane speed on the basis of a change over time in the image plane position;
- a statistical device that a) performs statistical analysis on a sample interval, wherein the sample interval is composed of the image plane position and the image plane speed, and b) determines undetermined coefficients in an equation of motion, wherein the equation includes the image plane position and the image plane speed and is selected beforehand; and
- a predicting device that computes a predicted value of the image plane position on the basis of a solution of the equation of motion. The solution can be a time dependent function.

Other objects, advantages and salient features of the invention will become apparent from the detailed description taken in conjunction with the annexed drawings.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Hereafter, the preferred embodiment of the present invention will be described with reference to the drawings.

Figure 1:
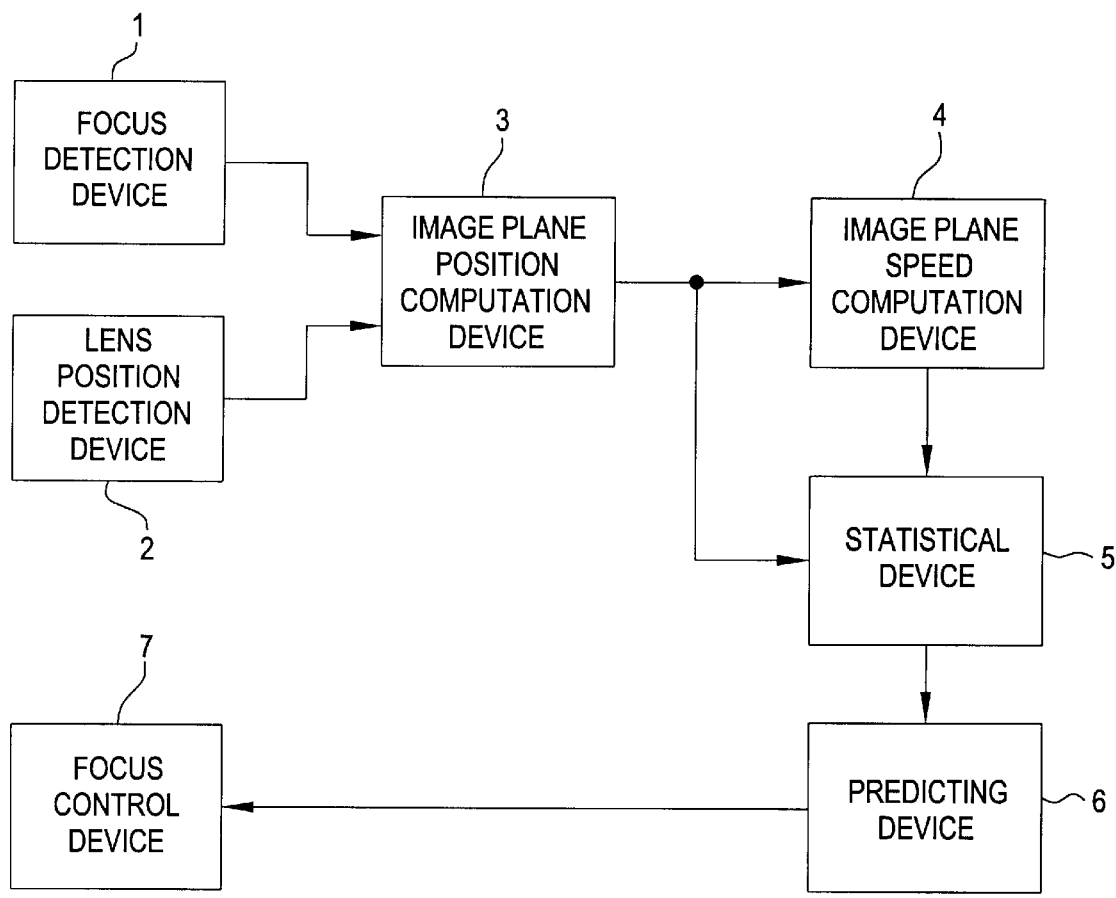
FIG. 1 is a fundamental block diagram of the invention.

FIG. 1 is a fundamental block diagram corresponding to the invention.

The invention as shown in FIG. 1 includes a focus adjustment apparatus having a focus detection device 1 which detects a defocus amount of the photographing optical system; a lens position detection device 2 which detects a lens position of the photographing optical system; and an image plane position computation device 3 which computes an image plane position of an object image on the basis of the defocus amount and the lens position.

The focus adjustment apparatus further includes an image plane speed computation device 4 which computes the image plane speed on the basis of a change in the image plane position over time computed by the image plane position computation device 3, and a statistical device 5 which performs statistical analysis on a sample interval. The sample interval is composed of the image plane position and the image plane speed, and determines the undetermined coefficients in the equation of motion established beforehand. The equation of motion includes the image plane position and image plane speed"

The focus adjustment apparatus further includes a predicting device 6 which computes the predicted value of the image plane position on the basis of a solution of the equation of motion having the undetermined coefficients determined by the statistical device 5; and a focus control device 7 which accomplishes focus control on the basis of the predicted value of the image plane position computed by the predicting device 6.

The equation of motion can be an "equation of motion for the image space side" obtained through a mapping transformation of a motion model of an object in an object space into an image space side of the photographing optical system. The object is assumed to be one of a collision object and a passing object.

The equation of motion can be an equation wherein the motion model of the object passing at a speed v along a traveling path separated by a distance h from the camera is approximately transformed via mapping onto the image space side of the photographing optical system; and, $$Vim/Y^3 = \alpha \cdot (tc - \tau) \tag{1}$$

(where Y is the amount of discrepancy between the image plane and the focal point, Vim is the image plane speed, tc is the detection time and $\alpha$ and $\tau$ are undetermined coefficients).

The equation of motion can be an equation wherein the motion model of the object which approaches the camera at a speed v is approximately transformed via mapping onto the image space side of the photographing optical system; and, $$Yc = \beta \cdot |Vim|^{1/2} + Cp \qquad (2)$$

(where Yc is the image plane position, Vim is the image plane speed and $\beta$ and Cp are undetermined coefficients).

The statistical device 5 can accomplish regressive analysis for a plurality of equations of motion, and can determine the undetermined coefficients utilizing an equation of motion in which the contribution rate for regressive analysis is high.

The focus adjustment apparatus can also include a plurality of equations of motion, wherein the plurality of equations of motion includes:

$$Yc = \beta \cdot |Vim|^{1/2} + Cp \qquad (2)$$

where Yc is the image plane position, Vim is the image plane speed and $\beta$ and Cp are undetermined coefficients, and $$Vim/(Yc-Cp)^3 = \alpha \cdot (tc - \tau) \qquad (3)$$

where Yc is the image plane position, Vim is the image plane speed, tc is the detection time and $\alpha$ and $\tau$ are undetermined coefficients. In addition, the statistical device 5 can accomplish regressive analysis on the basis of equation (2), and can move to regressive analysis on the basis of equation (3) following the drop in the contribution rate for this regressive analysis.

The predicting device 6 can compute the predicted value of the image plane position by making a linear approximation of the solution of the equation of motion, wherein the undetermined coefficients of the equation of motion are determined by the statistical device 5. The solution can be a time dependent function.

The image position computation device 3 can compute the image plane position of the object image using the defocus amount and the lens position.

The image plane speed computation device 4 can also find the image plane speed by computing the change over time in the image plane position.

The statistical device 5 accumulates the "image plane position" and the "image plane speed" described above as sample data.

Prior to accumulation of sample data, the "equation of motion including the image plane position and the image plane speed" on the object space side is an equation containing undetermined coefficients. The coefficients are undetermined because the status of the object, including speed and position relative to the measured origin of the lens position, is uncertain.

These undetermined coefficients can be determined by establishing simultaneous equations by substituting a plurality of past sample data composed of the image plane position and the image plane speed.

However, these sample data include detection scattering, and consequently the confidence in the undetermined coefficients obtained from the simultaneous equations is low.

Hence, the statistical device 5 determines the undetermined coefficients of the equation of motion using a statistical algorithm.

The predicting device 6 obtains the time function of the image plane position by finding the solution (which is a time dependent function) of the equation of motion including the undetermined coefficients which have been determined.

In general, the equation of motion is determined before collection of sample data, and consequently the undetermined coefficients are substituted without change into the commonly known general solution. Thus, the "remaining arbitrary constants" need only be determined on the basis of collected sample data.

In this particular solution, it is possible to find the predicted value of the image plane position promptly by substituting the desired time that is to be predicted. The focus control device 7 accomplishes focus control on the basis of the predicted value of this image plane position.

According to one aspect of the invention, a motion model of the object in the object space is chosen before sample data for the object are collected. This motion model then undergoes mapping transformation using actual measurements (e.g., sample data), imaging formulas, optical ray tracking and the like, and the equation of motion on the image space side is found.

Figure 2:
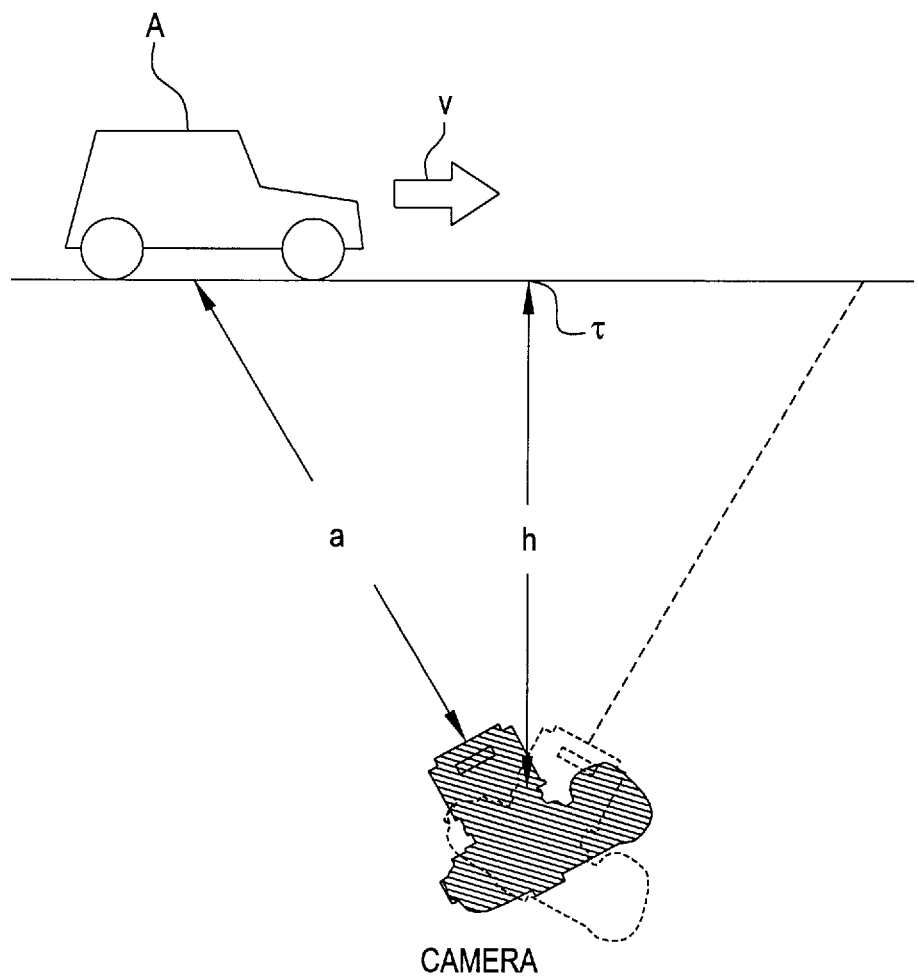
FIG. 2 is a diagram showing motion of a passing object.

According to another aspect of the invention, the object A is assumed to be a passing object, e.g., an object which travels at a speed v along a traveling path, as shown in FIG. 2. The path is separated from the camera by a distance h, and the object A is a distance a from the camera.

Figure 4:
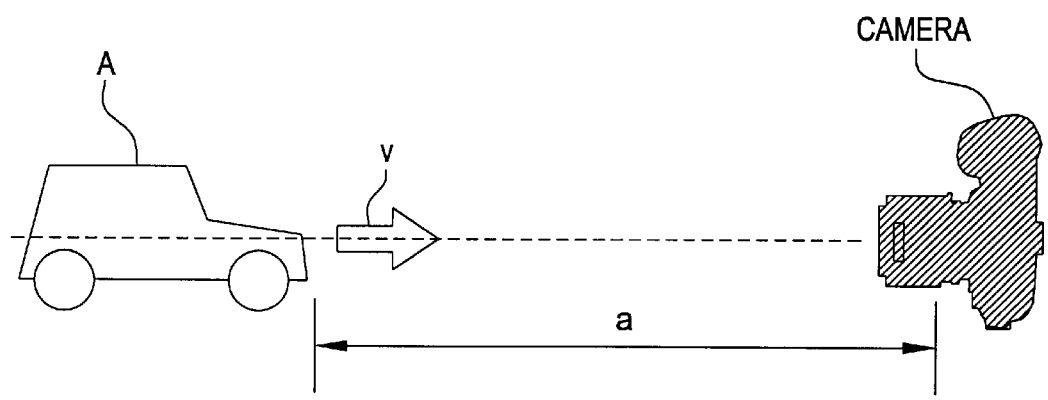
FIG. 4 is a drawing showing motion of a collision object.

In contrast, FIG. 4 shows a collision object A moving toward a camera at a velocity v, wherein the object A is a distance a from the camera.

With respect to FIG. 2, calling $\tau$ the time of closest approach of this object and tc the detection time, the distance a to the object is $$a = [h^2 + \{v(tc-\tau)\}^2]^{1/2} \qquad (5)$$

Figure 3:
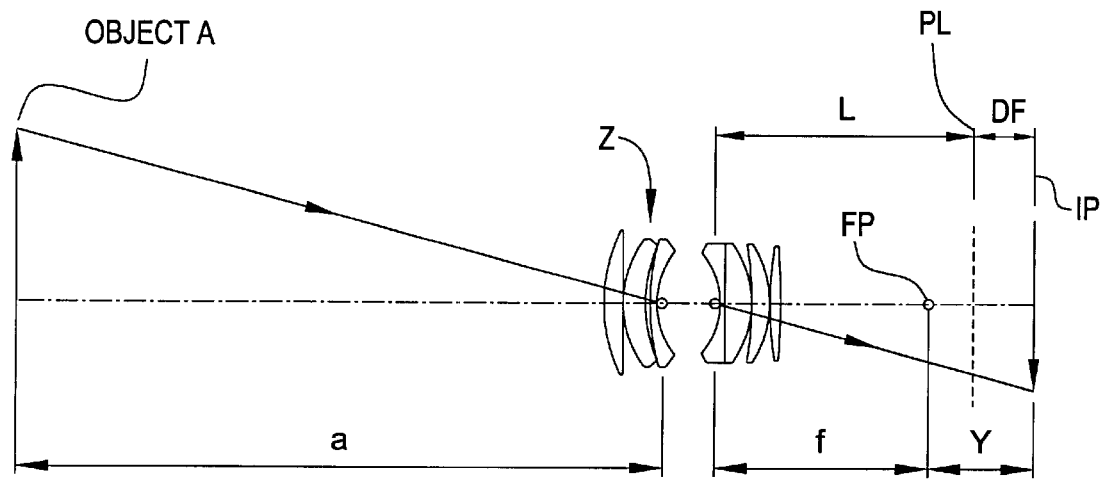
FIG. 3 is a drawing showing an image space formed by the photographing optical system.

FIG. 3 shows an object A, located a distance a from a photographing optical system Z, a lens position L, a defocus amount DF, a focal length f, an object image plane IP, an imaging plane PL, a focal point FP, and a discrepancy amount Y. When the motion model on the object space side indicated by equation (5) undergoes a mapping transformation in the region close to the axis, as shown in FIG. 3, with f as the focal length of the photographing optical system and Y as the amount of discrepancy between the focal point and the image plane (one type of image plane position), the result is:

$$Y = f^2/[[h^2 + \{v(tc-\tau)\}^2]^{1/2} - f] \qquad (6)$$

In normal photography, (a>>f), and consequently the following approximation can be made:

$$Y \approx f^2/[h^2 + \{v(tc-\tau)\}^2]^{1/2} \qquad (7)$$

When the image plane speed Vim is found by taking the time derivative of the discrepancy amount Y in equation (7), the result is:

$$Vim = -f^2 v^2 t/[h^2 + \{v(tc-\tau)\}^2]^{3/2} \qquad (8)$$

When equation (7) is substituted into this equation (8), and the "equation of motion including the discrepancy amount Y and the image plane speed Vim" is established, the result is:

$$Vim/Y^3 = -v^2(tc-\tau)/f^4 \qquad (9)$$

By manipulating the undetermined coefficients in equation (9), the equation of motion (1) containing the two undetermined coefficients $\alpha$ and $\tau$ is obtained.

$$Vim/Y^3 = \alpha \cdot (tc-\tau) \quad (1)$$

Here, the left hand side ($Vim/Y^3$) of the equation (1) is computed on the basis of the discrepancy amount Y obtained from the image plane position computation device 3 and the image plane speed Vim obtained from the image plane speed computation device 4. When this is done, the value of the left hand side ($Vim/Y^3$) of the equation of motion (1) satisfies the locus of a first order function of the detection time tc.

The statistical device 5 performs first order regressive analysis as follows and determines the undetermined coefficients $\alpha$ and $\tau$ using the left hand side ($Vim/Y^3$) and the detection time tc as the input variables.

$$Uav = (1/N) \sum^N (Vim/Y^3) \quad (10)$$

$$Tav = (1/N) \sum^N tc \quad (11)$$

$$Stt = \sum^N (tc - Tav)^2 \quad (12)$$

$$Sut = \sum^N (tc - Tav)((Vim/Y^3) - Uav) \quad (13)$$

Using the values of the above equations (10) through (13), the undetermined coefficients $\alpha$ and $\tau$ are computed from: a discrepancy amount Y, a defocus amount DF, and a lens position L.

Figure 5:
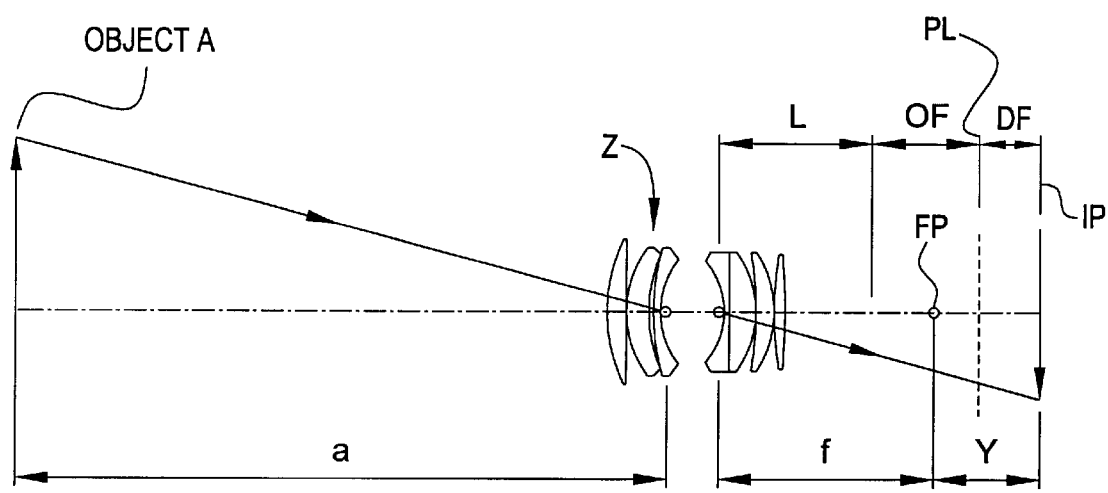
FIG. 5 is a drawing showing an image space formed by the photographing optical system.

When the motion model on the object space side indicated in equation (17) undergoes mapping transformation in the region near the axis as shown in FIG. 5, with f as the focal length of the photographing optical system and Y as the discrepancy between the focal point and the image plane, the result is:

$$Y = f^2/[v|(tc-\tau)|-f] \quad (18)$$

Because (a>>f) in normal photography, the approximation:

$$Y \cong f^2/[v|tc-\tau|] \quad (19)$$

can be made.

Here, the image plane position computation device 3 finds the image plane position Yc by computing $$Yc = L + DF \quad (20)$$

using the lens position L and defocus amount DF which have been converted to the same unit system.

In this case, the image plane position Yc and the discrepancy amount Y have the relationship $$Y = Yc - Cp \quad (21)$$

as shown in FIG. 5, wherein (Cp=f−OF).

Assuming the case where the measurement offset in the lens position computation device 2 is unclear on the focus adjustment apparatus side, Cp is handled as an undetermined coefficient. Naturally, when the measurement offset is commonly known, it is possible to determine Cp promptly.

Here, by substituting equation (21) into equation (19), the result is:

$$Yc = f^2/[v|tc-\tau|] + Cp \quad (22)$$

When the magnitude of the image plane speed |Vim| is found by taking the time derivative of the image plane position Yc in equation (22), the result is:

$$\alpha = Sut/Stt \quad (14)$$

and $$\tau = Tav - Uav/\alpha. \quad (15)$$

The general solution to the equation of motion (1) is:

$$Y(tc) = 1/[C - \alpha(tc-\tau)^2]^{1/2} \quad (16)$$

In equation (16), the undetermined coefficients $\alpha$ and $\tau$ have already been determined.

The sole undetermined coefficient C in equation (16) is a value relating to the distance h between the camera and the travel path, and is an arbitrary constant.

This arbitrary constant C can be determined promptly by substituting the past discrepancy amount Y and detection time tc into equation (16).

Through the above computation process, the "time function of the discrepancy amount Y" can be designated as shown in equation (16).

The predicting device 6 can compute the predicted value of the discrepancy amount Y by substituting the desired prediction time tc into equation (16). The focus control device 7 accomplishes focus control on the basis of this predicted value of the image plane position.

According to another aspect of the invention, the object is assumed to be one which approaches or recedes from the camera at a speed v.

Calling $\tau$ the time of closest approach of this object and tc the detection time, the distance a to the object is:

$$a = v|(tc-\tau)| \quad (17)$$

FIG. 5 shows an image space formed by a photographing optical system Z. FIG. 5 further shows an object A located a distance a from the system Z, a lens position measurement offset OF, an object image plane IP, an imaging plane PL, a focal point FP, a focal length f, $$|Vim| = f^2/[v(tc-\tau)^2] \quad (23)$$

When equation (23) is substituted into equation (22) above and the "equation of motion including the image plane position Yc and the image plane speed Vim" is established, the result is:

$$Yc = f \cdot (|Vim|/v)^{1/2} + Cp \quad (24)$$

Here, by manipulating the undetermined coefficients in equation (24), the equation of motion (2) including the two undetermined coefficients $\beta$ and Cp is obtained.

$$Yc = \beta \cdot |Vim|^{1/2} + Cp \quad (2)$$

The statistical device 5 performs the following first order regressive analysis using the image plane position Yc and the square root of the image plane speed ($|Vim|^{1/2}$) as the input variables, and determines the undetermined coefficients $\beta$ and Cp appropriately.

$$Yav = (1/N) \sum^N Yc \quad (25)$$

$$Rav = (1/N) \sum^N |Vim|^{1/2} \quad (26)$$

-continued $$Syy = \overset{N}{\Sigma} (Yc - Yav)^2 \qquad (27)$$

$$Syr = \overset{N}{\Sigma} (Yc - Yav) (|Vim|^{1/2} - Rav) \qquad (28)$$

The undetermined coefficients β and Cp are computed from $$\beta = Syy/Syr, \text{ and} \qquad (29)$$

$$\tau = Yav - \beta \cdot Rav \qquad (30)$$

The general solution of the equation of motion (2) is:

$$Yc(tc) = \beta^2/|tc - \tau| + Cp \qquad (31)$$

The sole undetermined coefficient τ in equation (31) is the time τ of closest approach of the object, and is an arbitrary constant.

This arbitrary constant τ can be determined promptly by substituting the past image plane position Yc and the detection time tc into equation (31).

Through the above computation process, the "time function of the image plane position Yc" can be designated as indicated by equation (31).

The predicting device 6 can compute the predicted value of the image plane position Yc by substituting the desired prediction time tc into equation (31). The focus control device 7 accomplishes focus control on the basis of the predicted value of the image plane position.

According to another aspect of the invention, the statistical device 5 accomplishes regressive analysis on a plurality of equations of motion. The statistical device utilizes equations of motion with a high contribution rate in the process of accomplishing this regressive analysis.

Through this operation, the statistical device 5 can select the equation of motion that coincides with the motion of the object appropriately on the basis of the contribution rate.

Accordingly, the predicting device 6 can make the predicted value of the image plane position accurate with certainty using the solution (time function) of the appropriate equation of motion, and can markedly improve the focusing accuracy.

According to another aspect of the invention, equation (2) is used with an object assumed to be a collision object and equation (3) is used with an object assumed to be a passing object.

The statistical device 5 first accomplishes regressive analysis on the basis of equation (2), and determines the undetermined coefficients β and Cp.

During the period where the contribution rate of this regressive analysis is kept high, the statistical device 5 and the predicting device 6 execute the prediction computation on the basis of the equation of motion (2) of a collision object.

On the other hand, when the contribution rate of this regressive analysis drops, the statistical device 5 and the predicting device 6 move to predictions on the basis of the equation of motion (3) of a passing object.

Normally, when the distance a to the object is sufficiently large, the "motion model of a passing object" and the "motion model of a collision object" roughly match.

In addition, when focus control is started, the probability that the object is sufficiently far from the camera is large.

Accordingly, at the start of focus control, by arbitrarily deciding that the object is a collision object and starting predictions, it is possible to start reliable prediction computations swiftly regardless of whether the object is a passing object or a collision object.

Furthermore, because the basis for prediction is switched from the equation of motion (2) of a collision object to the equation of motion (3) for a passing object in accordance with the drop in the contribution rate Ct, for passing objects it is possible to move smoothly to a precise prediction computation.

According to another aspect of the invention, the prediction device 6 finds a linear approximation to the solution of the equation of motion.

For example, the equation of motion:

$$Vim(Y, tc) = \alpha \cdot (tc - \tau) \cdot Y^3 \qquad (32)$$

results by determining the undetermined coefficients α and τ assuming a passing object.

By taking the time derivative of both sides of this equation (32), the image plane speed Aim can be found to be:

$$Aim(Y, tc) = \alpha \cdot Y^3 + 3\alpha(tc - \tau) \cdot Y^2 \cdot Vim = \alpha \cdot y^3 \cdot [1 + 3\{\alpha(tc - \tau) \cdot Y\}^2] \qquad (33)$$

Accordingly, when the image plane position Y0 is assumed at the detection time t0, the image plane position after a predetermined time Δt can be linearly approximated in the form:

$$Y(t0 + \Delta t) = Y0 + Vim(Y0, t0) \cdot \Delta t + Aim(Y0, t0) \cdot \Delta t^2/2 \qquad (34)$$

In general, the nth-order differential coefficients are found by repeatedly taking the derivative of the equation of motion. By substituting this into the Taylor series it is possible to make a linear approximation to the image plane position after a predetermined time in the error range of the nth-order remainder term.

In the linear approximation of the conventional example, the image plane speed Vim is computed from the previous difference from the image plane position Y. Consequently, a phase difference occurs between the image plane position Y and the image plane speed Vim. In the computation of the image plane acceleration Aim, the image plane positions Y of the past three times are necessary, and hence a larger phase difference occurs.

Accordingly, in the conventional linear prediction, the accuracy of the prediction was poor because these phase differences accumulated as errors.

However, in the linear approximation of the present invention, the nth-order differential coefficient is found directly from the equation of motion, and consequently the above-described phase differences do not accumulate as errors, so it is possible to obtain a high degree accuracy.

Here the case where the Taylor series is used as a linear approximation was explained as a representative case, but this is intended to be illustrative and not limiting. For example, the Newton-Raphson formula or other asymptotic method can be used as the linear approximation. Even in these cases, the above-described phase differences do not accumulate as errors each time the approximation is repeated, and consequently it is possible to obtain a high degree accuracy.

Figure 6:
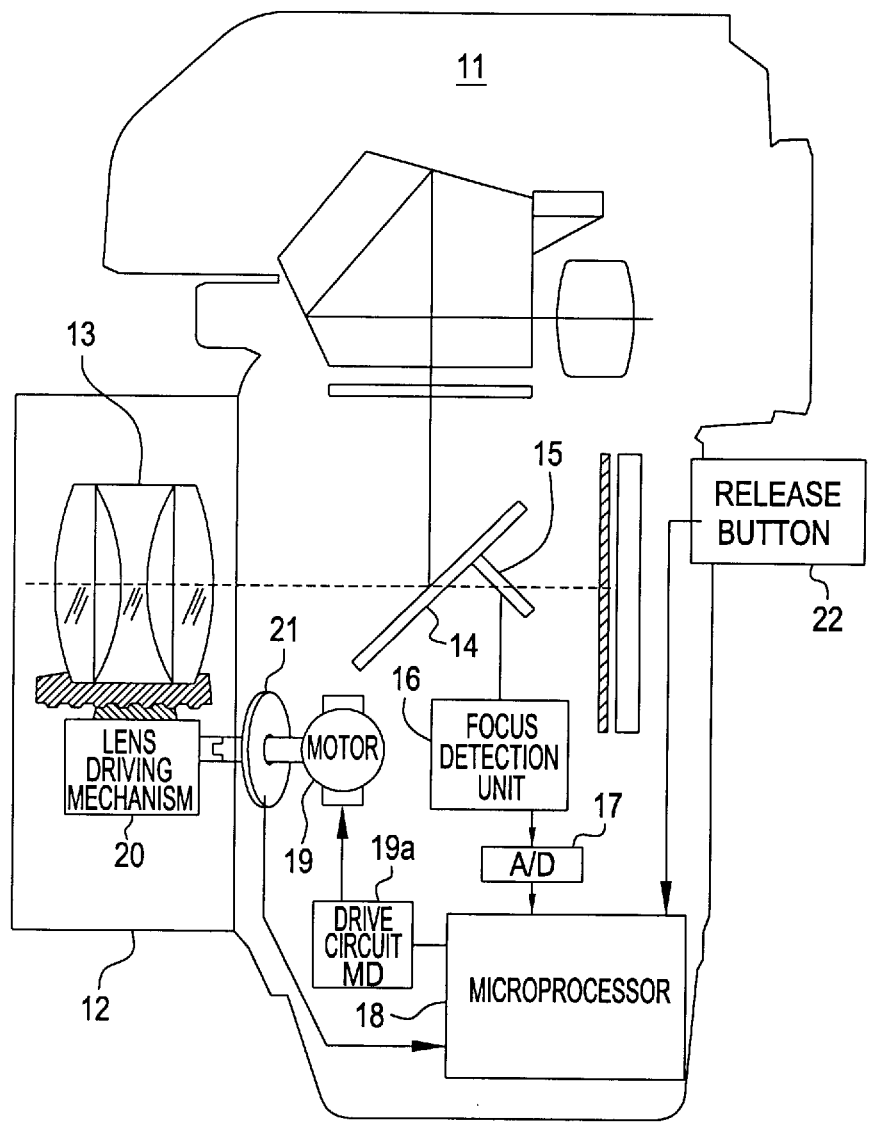
FIG. 6 is a drawing showing the invention according to a preferred embodiment.

FIG. 6 is a drawing showing a preferred embodiment.

In FIG. 6, a lens barrel 12 is attached to the front surface of the camera body 11, and a photographing optical system 13 is positioned inside the lens barrel 12.

A mirror 14 and an auxiliary mirror 15 are positioned in order on the optical axis of the photographing optical system 13, and a focus detection unit 16 is positioned in the direction of reflection from the auxiliary mirror 15. The photoelectric output from this focus detection unit 16 is connected to a microprocessor 18 via an A/D converter 17.

In addition, the PWM (pulse width modulation) output of the microprocessor 18 is connected to a motor 19 via a drive circuit 19a, and the drive force of this motor 19 is transferred to a lens driving mechanism 20 in the lens barrel 12. This lens driving mechanism 20 scrolls the focus adjustment lens group of the photographing optical system 13 forward and backward.

An encoder 21 is positioned on a drive shaft of the motor 19, and detects the number of revolutions of the motor 19. A pulse output of the encoder 21 is connected to the microprocessor 18. In addition, a release button 22 is connected to the microprocessor 18.

Figure 7:
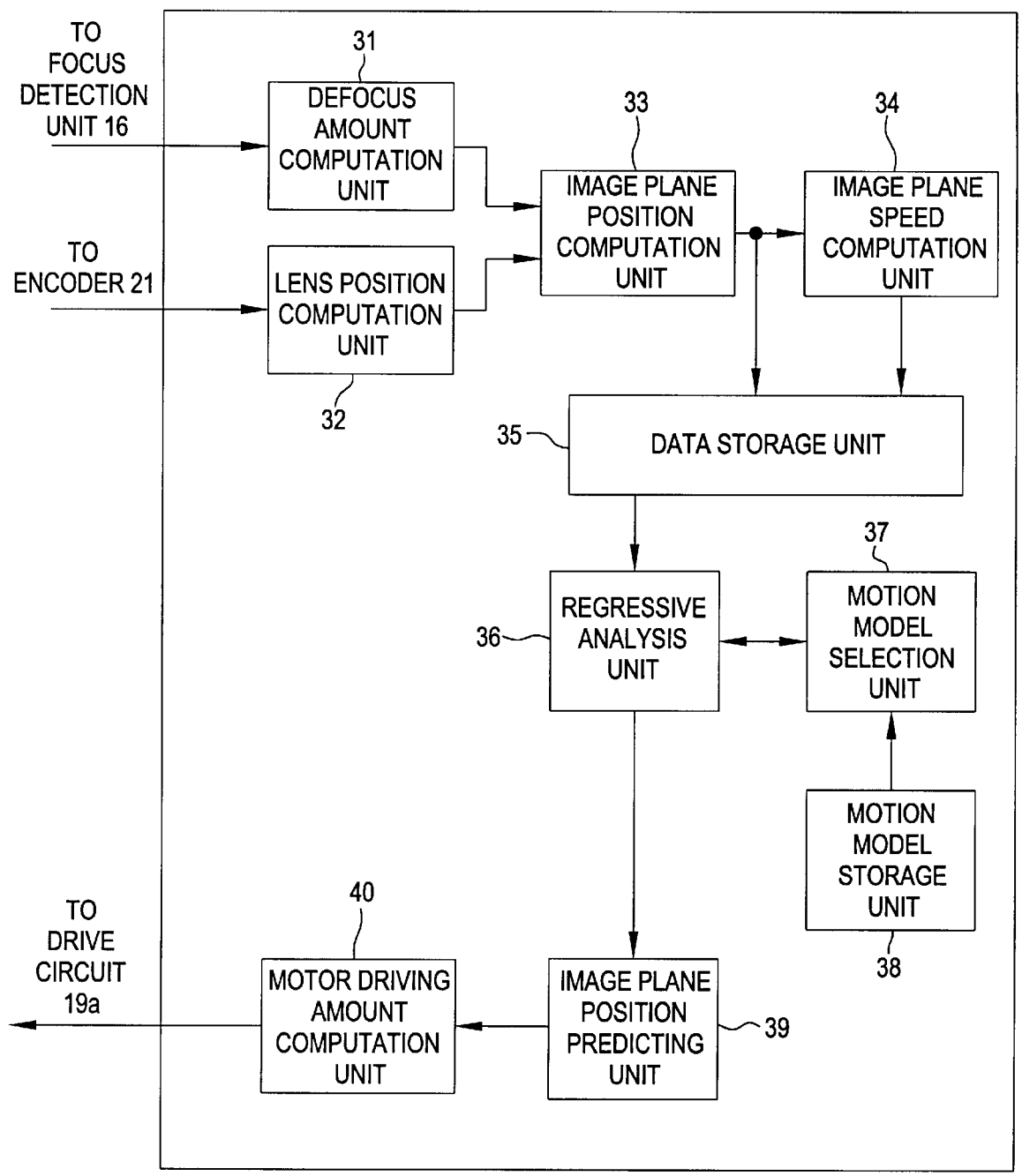
FIG. 7 is a block diagram showing internal functions of a microprocessor 18.

FIG. 7 is a block diagram describing the internal functions of the microprocessor 18. The internal functions of the microprocessor 18 will now be described with reference to FIG. 7.

First, the photoelectric output of the focus detection unit 16 is transferred to a defocus amount computation unit 31. The defocus amount computation unit 31 computes the defocus amount using a commonly known correlation algorithm.

In addition, the pulse output of the encoder 21 is transferred to a lens position computation unit 32. The lens position computation unit 32 computes the lens position by counting the pulse output.

The defocus amount and lens position computed in this manner are transferred to an image plane position computation unit 33. The image plane position computation unit 33 converts the defocus amount value and the lens position value to the same units, adds the values, and computes the image plane position Yc.

The image plane position Yc is transferred to an image plane position computation unit 34. The image plane position computation unit 34 computes the change over time in the image plane position Yc, and finds the image plane speed Vim.

The image plane position Yc and image plane speed Vim sample data are accumulated in the data storage unit 35 along with the detection time tc.

The accumulated sample data are successively read out from the data storage unit to a regressive analysis unit 36. The regressive analysis unit 36 reads the algorithm process for regressive analysis from a motion model storage unit 38 via a motion model selection unit 37. The regressive analysis unit 36 executes regressive analysis on the above-described sample data on the basis of this algorithm process.

The contribution rate Ct found by this algorithm process for regressive analysis is returned to the motion model selection unit 37. The motion model selection unit 37 switches the algorithm process of the motion model storage unit 38 in accordance with the value of this contribution rate Ct.

The undetermined coefficients determined in the regressive analysis unit 36 are transferred to an image plane position predicting unit 39. The image plane predicting unit 39 finds the time function of the image plane position on the basis of the undetermined coefficients, and predicts the image plane position.

The image plane position predicted in the image plane position predicting unit 39 is transferred to a motor driving amount computation unit 40. The motor driving amount computation unit 40 detects the motor driving amount on the basis of this predicted value of the image plane position, and outputs this to the drive circuit 19a.

Figure 8:
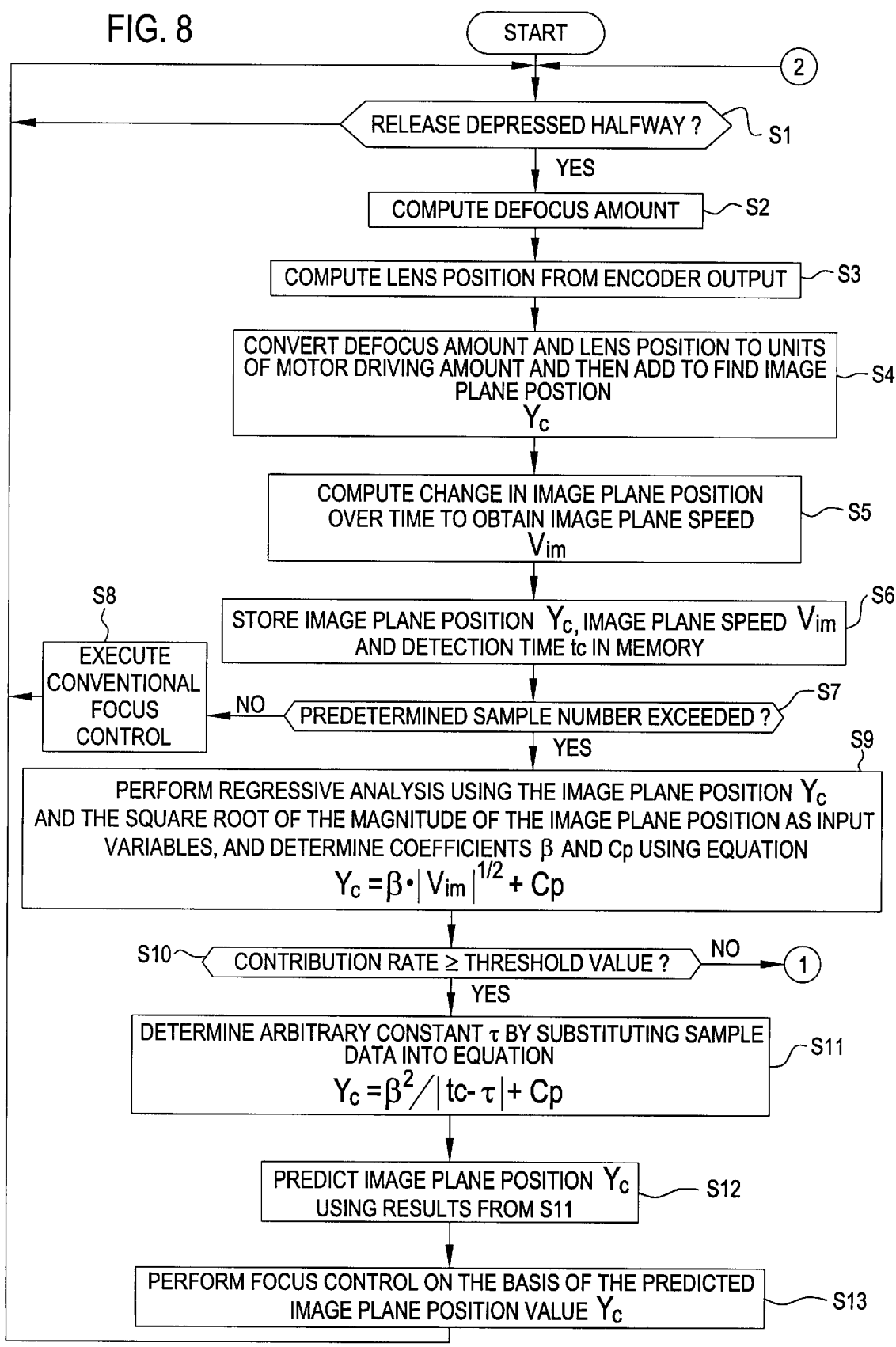
FIG. 8 is a flowchart showing operation of the preferred embodiment.
Figure 9:
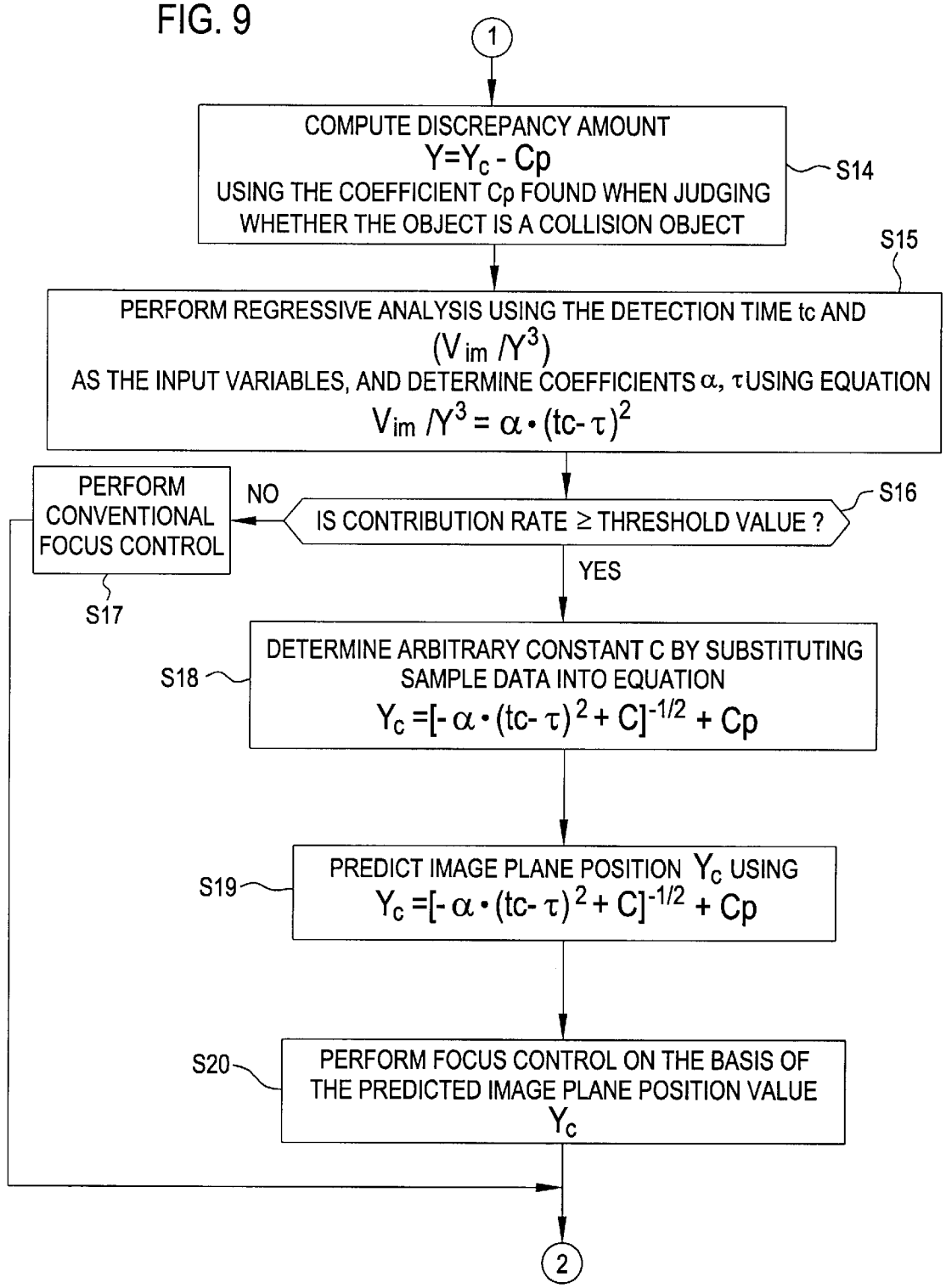
FIG. 9 is a flowchart showing operation of the preferred embodiment.

FIGS. 8 and 9 are flowcharts showing the operation of the preferred embodiment.

Hereafter, the process procedures and algorithm examples of the microprocessor 18 will be described in order in accordance with the flowcharts shown in FIGS. 8 and 9.

In step S1, when the release button 22 is depressed halfway, accumulation of photoelectric charge is started in the focus detection unit 16. The accumulated photoelectric charge is transferred and supplied to the microprocessor 18 as a photoelectric output.

In step S2, the microprocessor 18 processes the photoelectric output using a commonly known correlation algorithm, and computes the defocus amount DF suitable for the distances between the imaging plane and the object image plane.

The number of revolutions of the motor 19 is output as a pulse output from the encoder 21 and is transferred to the microprocessor 18.

In step S3, the microprocessor 18 counts this pulse output and detects the lens position L at the accumulation central time (hereafter, this accumulation central time will be called the "detection time tc") of the focus detection unit 16. This lens position L is in general a relative value in which the measurement origin is uncertain.

In step S4, the microprocessor 18 converts the defocus amount value DF and the lens position value L into common units for driving the motor 19. The microprocessor 18 adds the defocus amount DF and the lens position L, and finds the image plane position Yc.

Figure 10:
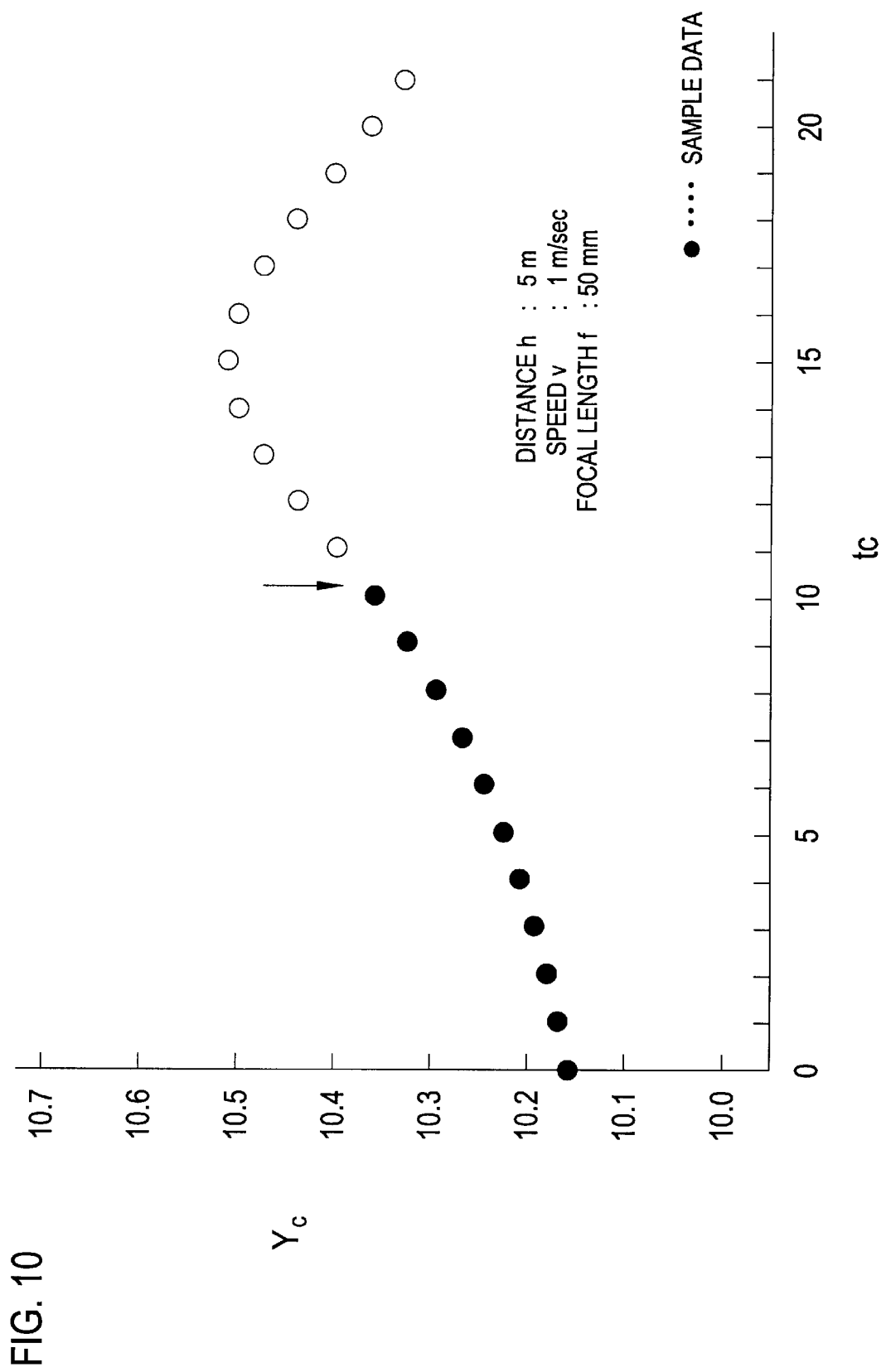
FIG. 10 is a drawing showing a detected value of an image plane position Yc.

FIG. 10 is a drawing showing the change over time in the image plane position Yc of a passing object. Hereafter, an example of the algorithm will be computed using the black dots in the drawing as sample data.

In step S5 of FIG. 8, the microprocessor 18 computes the image plane speed Vim on the basis of the difference over time in the image plane position Yc.

In step S6, the image plane position Yc, the computed image plane speed Vim, and the detection time tc are accumulated as sample data in the internal memory region of the microprocessor 18.

In step S7, the microprocessor 18 determines whether or not the number of sample data items exceeds a predetermined number. If the number of sample data items does not exceed the predetermined number, control proceeds to step S8.

In step S8, conventional focus control is performed and control proceeds to step S1 to repeat the cycle until the number of sample data items exceeds the predetermined number.

In step S7 when the microprocessor 18 determines that the number of sample data items exceeds the predetermined number, the microprocessor 18 proceeds to step S9 and starts the regressive analysis assuming a collision object as follows.

First, the microprocessor 18 finds the image plane position Yc and the square root of the magnitude of the image plane speed ($|Vim|^{1/2}$) as the input variables for regressive analysis.

Figure 11:
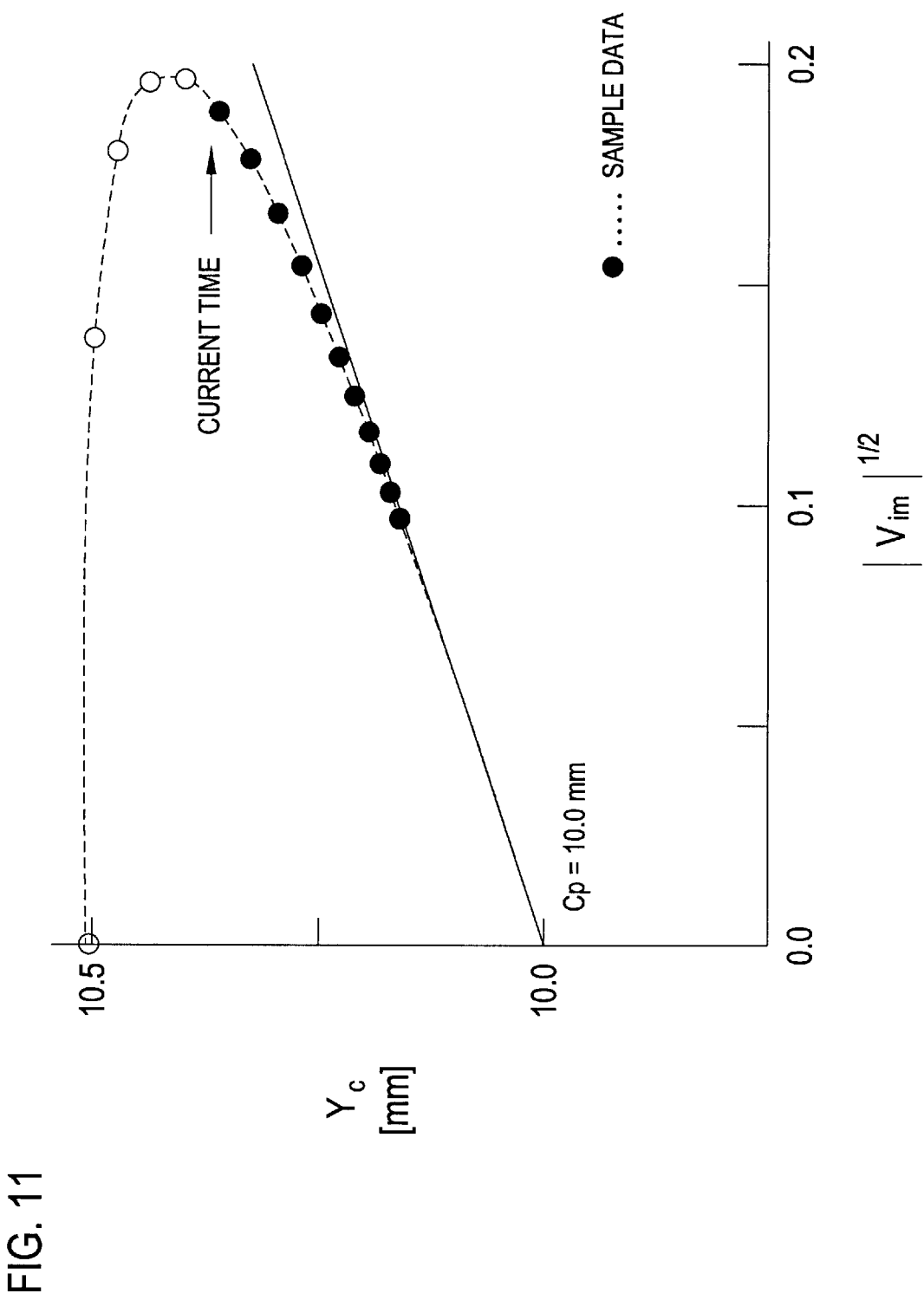
FIG. 11 is a drawing showing a condition track for a collision object.

FIG. 11 is a drawing of the condition track of the image plane position, with the image plane position Yc on the vertical axis and ($|Vim|^{1/2}$) on the horizontal axis. In the case of a collision object, this condition track is a linear track. The object shown in FIG. 11 is a passing object, and hence the track separates from this linear track as the object approaches the camera.

In step S9, the microprocessor 18 computes the above-described equations (25) through (30) for the two input variables, and determines the undetermined coefficients β and Cp in the below- described equation of motion equation (2).

$$Yc = \beta \cdot |Vim|^{1/2} + Cp \quad (2)$$

Next, the microprocessor 18 computes:

$$Srr = \sum_{}^{N} (|Vim|^{1/2} - Rav)^2 \quad (35)$$

and then computes $$Ct = Syr^2/(Syr \cdot Srr) \quad (36)$$

on the basis of the value of above-described equations (27), (28) and (35), and finds the contribution rate Ct of regressive analysis.

In step S10, the microprocessor 18 compares this contribution rate Ct to the threshold value. When the contribution rate Ct is at least as great as the threshold value (e.g., 0.8), the microprocessor 18 judges the object to be a collision object and proceeds to step S11.

In step S11, the past sample data is substituted into the general solution (37) of the equation of motion (2), and the remaining arbitrary constant τ is determined in accordance with the following equation:

$$Yc(tc) = \beta^2/|tc - \tau| + Cp \quad (37)$$

Through the above-described algorithm process, the "time function of the image plane position Yc" shown in equation (37) is designated. The microprocessor 18 computes the predicted value of the image plane position Yc by substituting the desired prediction time tc into the equation (37).

In step S13, focus control is performed on the basis of value of the image plane position Yc predicted in step S12. From step S13, control proceeds to step S1.

If in step S10 the contribution rate Ct falls below the threshold value (e.g., 0.8), the microprocessor 18 judges the object to be a passing object. Hence, the microprocessor 18 switches from the equation of motion (2) which assumes a collision object to the equation of motion (3) which assumes a passing object.

Accordingly, control proceeds to step S14 of FIG. 9, where the microprocessor 18 uses the undetermined coefficients found at the time of judging the collision object to compute the discrepancy amount Y between the focal point and the image plane:

$$Y = Yc - Cp \quad (38)$$

Next, in step S15, the microprocessor 18 finds the detection time tc and (Vim/Y³) as the input variables for regressive analysis.

Figure 12:
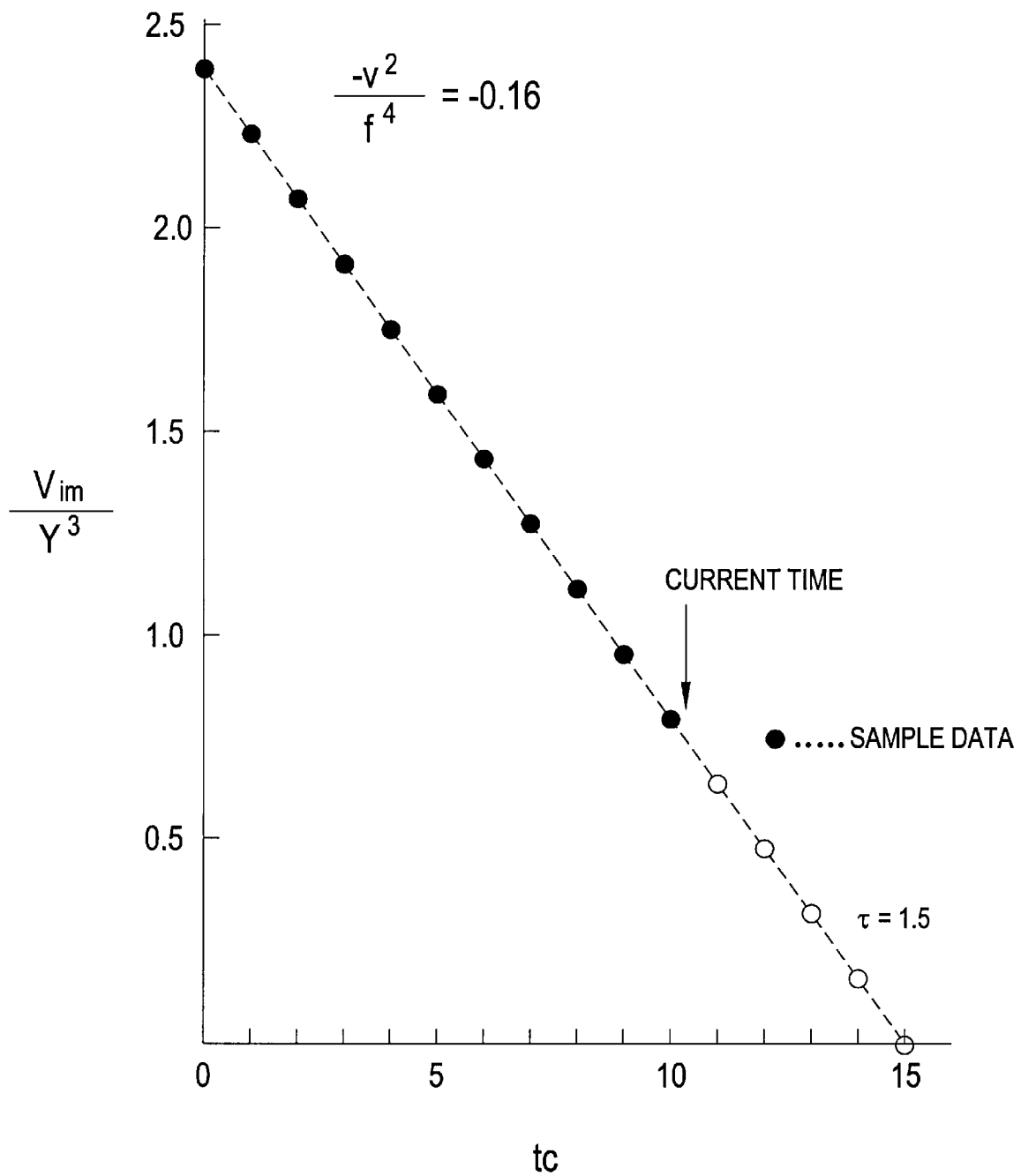
FIG. 12 is a drawing showing a condition track for a passing object.

FIG. 12 is a drawing of the condition track of the image plane position, with (Vim/Y³) on the vertical axis and the detection time tc on the horizontal axis. In the case of a passing object, the condition track is a linear track.

From step S14 control proceeds to step S15, wherein the microprocessor 18 computes the above-described equations (10) through (15) for these input variables, and determines the undetermined coefficients α and τ of the below-described equation of motion (3).

$$Vim/(Yc - Cp)^3 = \alpha \cdot (tc - \tau) \quad (3)$$

Next, the microprocessor 18 computes:

$$Suu = \sum_{}^{N} ((Vim/Y^3) - Uav)^2 \quad (39)$$

and computes $$Ct' = Sut^2/(Suu \cdot Stt) \quad (36)$$

and finds the contribution rate Ct' of regressive analysis.

In step S16, the microprocessor 18 compares the contribution rate Ct' to the threshold value.

If the contribution rate Ct' is less than a threshold value (e.g., 0.8), the motion of the object is not compatible with the assumed equation of motion, i.e., the object is not a collision object, and control proceeds to step S17 where conventional focus control is executed.

On the other hand, if at step S16 the contribution rate Ct' is determined to be at least as great as the threshold value (e.g., 0.8), the microprocessor 18 judges that the object is a passing object, and control proceeds to step S18.

In step S18, the microprocessor 18 substitutes the past sample data into the general solution (40) of the equation of motion (3), and determines the remaining arbitrary constant C.

$$Yc(tc) = 1/[C - \alpha(tc - \tau)^2]^{1/2} + Cp \quad (40)$$

Figure 13:
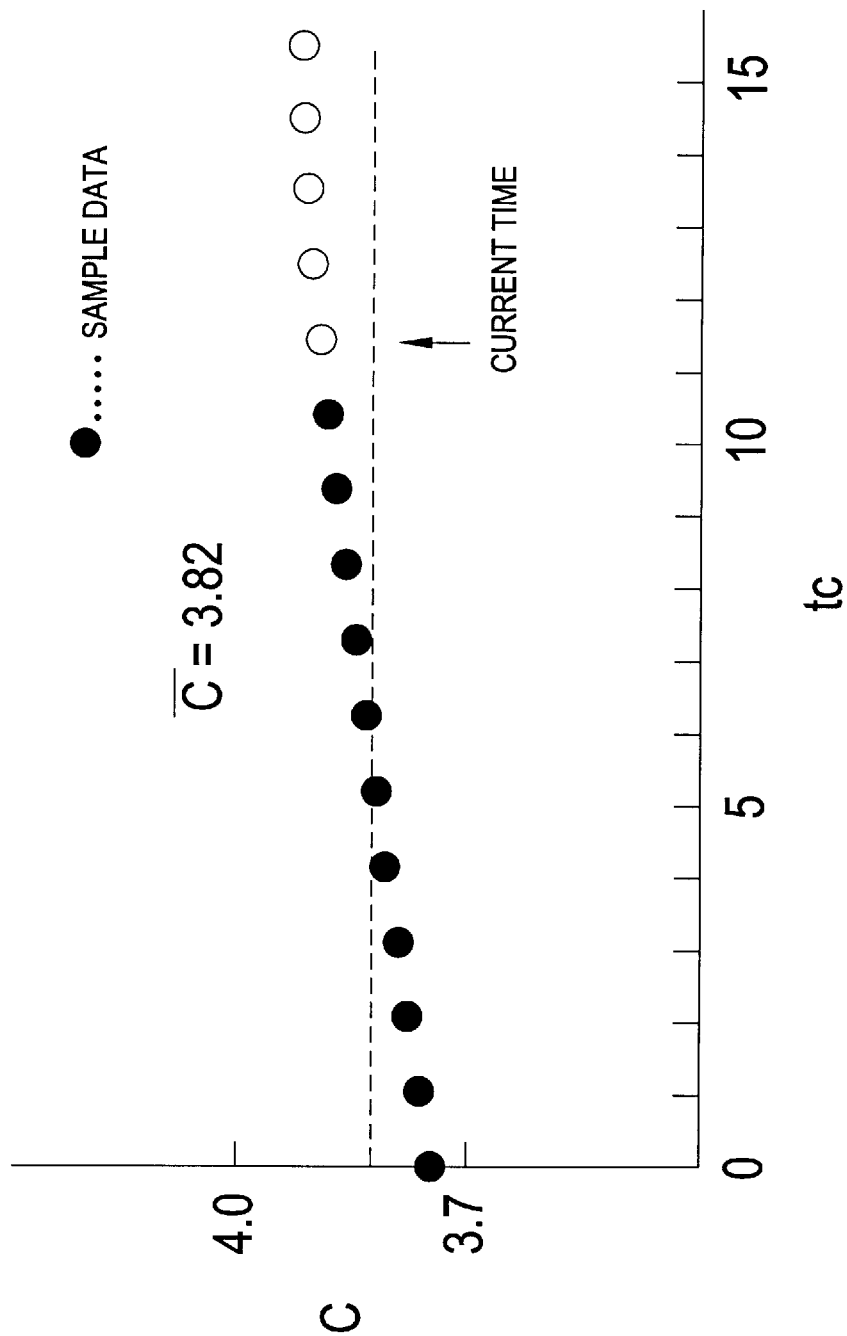
FIG. 13 is a drawing showing a scattering of an arbitrary constant C.

FIG. 13 is a drawing showing the scattering of the arbitrary constant C in the past sample data.

Through the above-described algorithm process, the "time function of the image plane position Yc" indicated by the equation (40) is designated.

In step S19, the microprocessor 18 computes the predicted value of the image plane position Yc by substituting the desired prediction time tc into the equation (40).

In step S20, focus control is then executed on the basis of the predicted value of the image plane position Yc.

Figure 14:
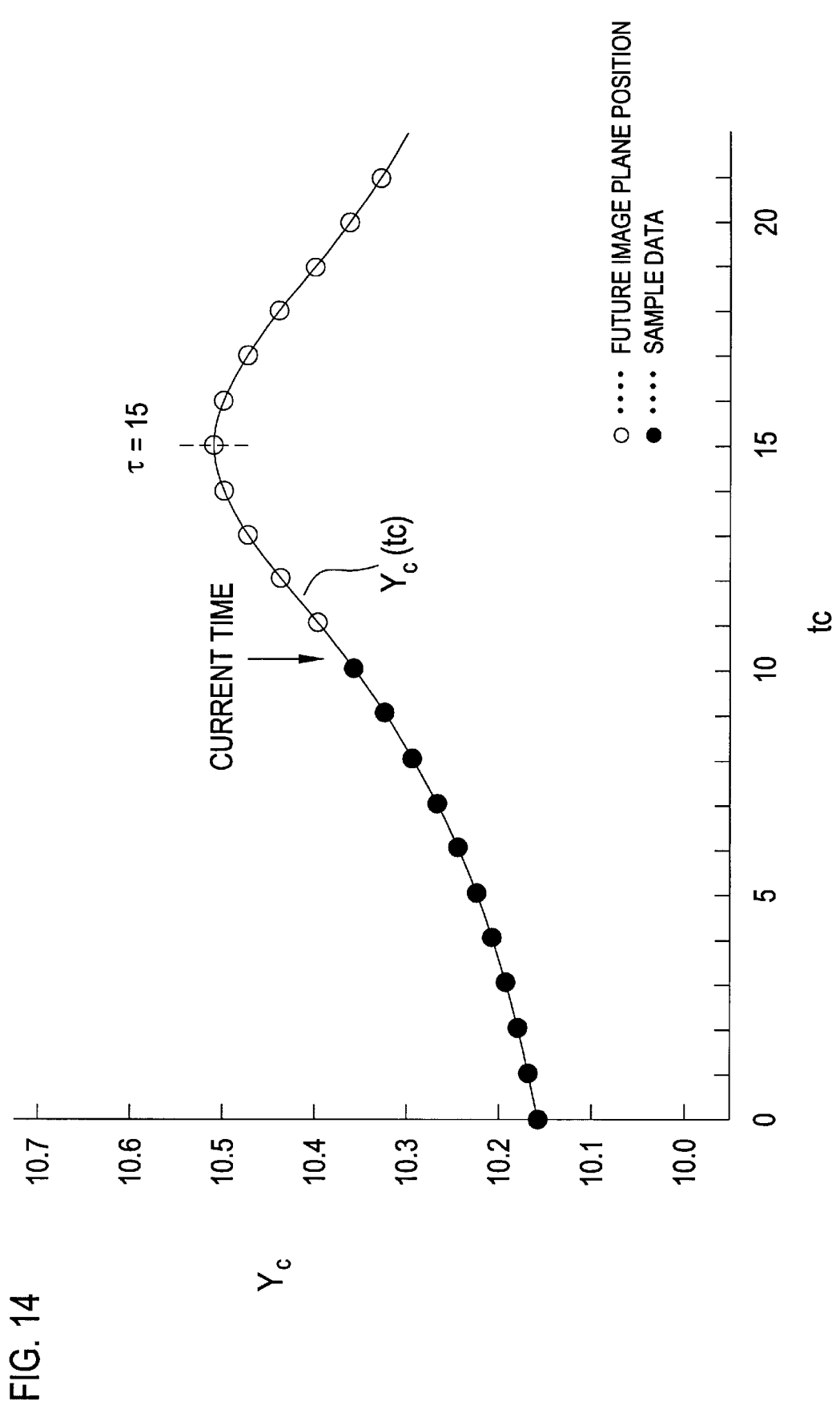
FIG. 14 is a drawing showing a predicting function for the image plane position Yc.

FIG. 14 is a drawing showing the results of the above-described algorithm process.

As a result of executing the above-described algorithm process on the basis of the sample data (the black dots on the curve as shown in FIG. 14), the predicting function (the curve shown in FIG. 14) for the image plane position Yc is obtained. This predicting function agrees with extremely high accuracy with the future image plane positions (the white dots on the curve as shown in FIG. 14).

Through the above-described operations, the image plane position can be easily and accurately predicted by determining the undetermined coefficients of the equation of motion assumed beforehand in the preferred embodiment of the focus adjustment apparatus.

In addition, the undetermined coefficients in the equation of motion are determined by a statistical algorithm. Consequently, it is possible to predict the image plane position with high accuracy even in cases where the defocus amount DF is widely scattered, as for example when photographing objects having low brightness or low contrast.

Furthermore, the "equation of motion for the image space side", which is the motion model for an object assumed in the object space which has undergone mapping transformation, is used, and consequently, the complex motion of the actual image plane position can be approximated with high accuracy. Accordingly, by using this kind of equation of motion, it is possible to predict the image plane position accurately and precisely.

In addition, the equation of motion (1) and the equation of motion (2) include higher order differential terms (the image plane acceleration and the like), and consequently the effects of phase delays and high-range noise are not received in the algorithm process, so that it is possible to predict the image plane position with high accuracy.

Furthermore, the equation of motion is selected in accordance with the contribution rate of regressive analysis, and consequently it is possible to switch to an equation of motion which matches the motion of the object flexibly and accurately.

In addition, in the present embodiment, at the start of focus control, predictions are started under the assumption that the object is a collision object, and consequently it is possible to start the appropriate prediction algorithm swiftly for both passing objects and collision objects, which have similar motion at far distances.

In the preferred embodiment, regressive analysis using two input variables was described, but there may be two or more types of input variables depending on the equation of motion. In such a case, it is possible to use the method of multiple regressive analysis.

In addition, in the preferred embodiment, the equation of motion is transformed into a first-order function and first-order regressive analysis is performed. However, the equation of motion is not limited to a first-order function. In general, the undetermined coefficients which obtain the least squares error may be designated for a predetermined function, and consequently, it is possible to utilize second-order functions, exponential functions or various other functions.

Furthermore, in the preferred embodiment, the equation of motion is selected on the basis of the contribution rate Ct. However, the basis for selecting the equation of motion need not be restricted to the contribution rate Ct. A value which can be converted to the contribution rate Ct may also be used. For example, the equation of motion may be selected on the basis of the correlation coefficients, the least squares error, or the like.

In addition, in the preferred embodiment, the image plane position is predicted by directly substituting the desired prediction time into the solution of the equation of motion. However, this is intended to be illustrative and not limiting. Alternatively, the predicted value of the image plane position may be computed through finding a linear approximation to the solution of the equation of motion. For example, it is possible to predict the image plane position using the Newton-Raphson method or the above-described equation (34).

As described above, the image plane position can be predicted by determining the undetermined coefficients in the equation of motion assumed or selected beforehand. Accordingly, it is possible to predict the image plane position accurately and easily by merely determining the above-described undetermined coefficients even for complex motion of the image plane position.

In particular, the image plane speed and image plane acceleration change in a complex way for objects which approach near to the camera and for objects which move at high speed. With the present invention, it is possible to obtain a particularly high predicting accuracy for these kinds of objects.

In addition, the undetermined coefficients in the equation of motion are determined through a statistical algorithm, and consequently the effects of measurement scattering in the defocus amount are not received, thus making it possible to determine the undetermined coefficients accurately.

Accordingly, it is possible to predict the image plane position with high accuracy for objects in which the measurement scattering in the defocus amount is large, as in objects having low brightness or low contrast.

According to an aspect of the invention, the "equation of motion for the object space side" is determined by a mapping transformation of the motion model of the object assumed in the object space into the image space of the photographing optical system.

In the conventional example, the image plane position is predicted on the basis of an assumption that the image plane speed is constant or the image plane acceleration is constant. Consequently, the discrepancy between the actual image plane position and the predicted image plane position becomes large, and it is difficult to obtain a sufficient predicting accuracy.

However, according to an aspect of the invention, an equation of motion is utilized in which the motion model of the object undergoes a mapping transformation into the image space. Consequently, the equation of motion is extremely close to the actual motion of the image plane position, making it possible to predict the image plane position with high accuracy.

According to an aspect of the invention, the equation of motion (1) is utilized in order to predict the image plane position of a passing object.

$$Vim/Y^3 = \alpha \cdot (tc - \tau) \quad (1)$$

In the equation of motion (1), the left hand side (Vim/Y3) is expressed as a first order function of the detection time tc, and consequently it is possible to determine the undetermined coefficients $\alpha$ and $\tau$ easily using the method of first-order regressive analysis.

In addition, the equation of motion (1) does not have a term for image plane acceleration.

In general, the image plane acceleration is computed from taking the differences in the image plane positions twice, and consequently the high-range noise and phase delay become large. However, the equation of motion (1) does not have a term for image plane acceleration. Consequently, the predicting accuracy of the image plane position is not adversely affected by large amounts of phase delay and high-end noise included in the image plane acceleration.

According to an aspect of the invention, the equation of motion (2) is utilized in order to predict the image plane position of a collision object.

$$Yc = \beta \cdot |Vim|^{1/2} + Cp \quad (2)$$

In the equation of motion (2), (Yc) is expressed as a first-order function of ($|Vim|^{1/2}$). Consequently, it is possible to easily determine the undetermined coefficients $\beta$ and Cp using the method of first-order regressive analysis.

In addition, the equation of motion (2) does not have a term for the image plane acceleration.

In general, the image plane acceleration is computed from taking the differences in the image plane positions twice. Consequently the high-range noise and phase delay included in the image plane acceleration become large. However, the equation of motion (2) does not have a term for image plane acceleration. Consequently, the predicting accuracy of the image plane position is not adversely affected by large amounts of phase delay and high-end noise included in the image plane acceleration.

According to an aspect of the invention, regressive analysis is performed using a plurality of equations of motion, and an equation of motion having a high contribution rate is utilized.

Through this kind of operation, it is possible to switch to an appropriate equation of motion in accordance with the actual motion of the object.

Accordingly, it is possible to markedly improve the predicting accuracy of the image plane position and the focusing accuracy.

According to an aspect of the invention, the equation (2) which assumes a collision object and the equation (3) which assumes a passing object are used as a plurality of equations of motion.

Normally, when the distance a to the object is sufficiently large, the "motion model for passing objects" and the "motion model for collision objects" roughly match.

In addition, when focus control is started, the probability is high that the object is sufficiently far from the camera.

Accordingly, it is possible to start an accurate predicting algorithm smoothly for both passing objects and collision objects by arbitrarily deciding that the object is a collision object and starting predictions.

Furthermore, switching from predictions based on the equation of motion (2) for a collision object to predictions based on the equation of motion (3) for a passing object is made in accordance with a drop in the contribution rate Ct. Consequently, it is possible to switch smoothly to the suitable predicting algorithm for a passing object.

In addition, the offset Cp of the image plane position is computed through a predicting algorithm which assumes the object to be a collision object. Accordingly, with the latter predicting algorithm, which assumes a passing object, it is possible to use the value of this offset Cp without change. Hence, it is possible to effectively reduce the volume of algorithm processing.

According to an aspect of the invention, the differential coefficients are found directly from the equation of motion which determines the undetermined coefficients, and from the image plane position after a predetermined time is computed through a linear approximation.

With this kind of linear approximation, no phase difference occurs between the image plane position and these differential coefficients, unlike the case of the conventional example, where the differential coefficients (image plane speed, image plane acceleration and the like) are found through a difference algorithm. Accordingly, it is possible to obtain a high approximating accuracy without accumulating the above-described phase difference in the linear approximation as an error.

As described above, with the focus adjustment apparatus of the present invention, it is possible to predict the complex motion of the image plane position accurately and easily, and consequently, it is possible to greatly improve the performance of focus adjustment greatly and to markedly increase the accuracy of the predicted value.

While this invention has been described in conjunction with specific embodiments outlined above, it is evident that many alternatives, modifications and variations will be apparent to those skilled in the art. For example, a microcomputer or other electronic device such as a hardwired electronic circuit could be used instead of the microprocessor 18 to control the operations shown in FIGS. 8 and 9. Accordingly, the preferred embodiments of the invention as set forth herein are intended to be illustrative, not limiting. Various changes may be made without departing from the scope of the invention as defined in the following claims.

What is claimed is:

1. A focus adjustment apparatus, comprising:

a focus detection means for detecting a defocus amount in an optical system including at least one lens;

a lens position detection means for detecting a position of the at least one lens;

an image plane position computation means for computing a position of an image plane of an object image based on the detected defocus amount and the detected lens position;

an image plane speed computation means for computing a speed of the image plane based on a change over time in the computed image plane position;

a statistical means for performing statistical analysis on a sample interval, wherein the sample interval is composed of the image plane position and the image plane speed, and the statistical means determines coefficients in an equation of motion that includes the image plane position and the image plane speed;

a predicting means for computing a predicted value of the image plane position based on a solution of the equation of motion including the determined coefficients; and a focus control means for controlling focus of the at least one lens based on the predicted value of the image plane position, wherein the equation of motion is an equation of motion for an image space side of the photographing optical system, and the equation is obtained through a mapping transformation of a motion model of an object in the object space into the image space side, wherein the object is assumed to be one of a passing object and a collision object, wherein the equation of motion is an equation wherein the motion model is of the object moving at a speed v along a path separated by a distance h from the at least one lens, and the motion model is approximately transformed via mapping onto the image space side of the photographing optical system, and the mathematical relationship $$Vim/Y^3 = \alpha \cdot (tc - \tau) \qquad (1)$$

is used, where Y is an amount of discrepancy between the image plane and a focal point of the at least one lens, Vim is the image plane speed, tc is a detection time and $\alpha$ and $\tau$ are undetermined coefficients.

2. The focus adjustment apparatus of claim 1, wherein the equation of motion is an equation wherein the motion model is of the object approaching the at least one lens at a speed v, and the motion model is approximately transformed via mapping onto the image space side, and the mathematical relationship $$Yc = \beta \cdot |Vim|^{1/2} + Cp \qquad (2)$$

is used, where Yc is the image plane position, Vim is the image plane speed and $\beta$ and Cp are undetermined coefficients.

3. The focus adjustment apparatus of claim 1, wherein:

the statistical means performs regressive analysis for a plurality of equations of motion, and determines coefficients of at least one of the plurality of equations of motion by utilizing an equation of motion in which the contribution rate for regressive analysis is high.

4. A focus adjustment apparatus, comprising:

a focus detection means for detecting a defocus amount in an optical system including at least one lens;

a lens position detection means for detecting a position of the at least one lens;

an image plane position computation means for computing a position of an image plane of an object image based on the detected defocus amount and the detected lens position;

an image plane speed computation means for computing a speed of the image plane based on a change over time in the computed image plane position;

a statistical means for performing statistical analysis on a sample interval, wherein the sample interval is composed of the image plane position and the image plane speed, and the statistical means determines coefficients in an equation of motion that includes the image plane position and the image plane speed;

a predicting means for computing a predicted value of the image plane position based on a solution of the equation of motion including the determined coefficients; and a focus control means for controlling focus of the at least one lens based on the predicted value of the image plane position, wherein the statistical means performs regressive analysis for a plurality of equations of motion, and determines coefficients of at least one of the plurality of equations of motion by utilizing an equation of motion in which the contribution rate for regressive analysis is high, wherein the plurality of equations of motion includes $$Yc = \beta \cdot |Vim|^{1/2} + Cp \quad (2)$$

where YC is an image plane position, Vim is an image plane speed and $\beta$ and $Cp$ are undetermined coefficients, and $$Vim/(Yc-Cp)^3 = \alpha \cdot (tc-\tau) \quad (3)$$

where Yc is the image plane position, Vim is the image plane speed, tc is a detection time and $\alpha$ and $\tau$ are undetermined coefficients, and the statistical means performs regressive analysis based on equation (2), and performs regressive analysis based on equation (3) following a drop in the contribution rate for this regressive analysis.

5. The focus adjustment apparatus of claim 1, wherein the predicting means computes the predicted value of the image plane position by making a linear approximation of the solution of the equation of motion, the equation of motion having coefficients determined by the statistical means.

6. The focus adjustment apparatus of claim 5, wherein the solution is a time dependent function.

7. A focus adjustment apparatus, comprising:

a focus detection device for detecting a defocus amount in an optical system including at least one lens;

a lens position detection device for detecting a position of the at least one lens;

an image plane position computation device for computing a position of an image plane of an object image based on the detected defocus amount and the detected lens position;

an image plane speed computation device for computing a speed of the image plane based on a change over time in the computed image plane position;

a statistical device for performing statistical analysis on a sample interval, wherein the sample interval is composed of the image plane position and the image plane speed, and the statistical device determines coefficients in an equation of motion that includes the image plane position and the image plane speed;

a predicting device for computing a predicted value of the image plane position based on a solution of the equation of motion including the determined coefficients; and a focus control device for controlling focus of the at least one lens based on the predicted value of the image plane position, wherein the equation of motion is an equation of motion for an image space side of the photographing optical system, and the equation is obtained through a mapping transformation of a motion model of an object in the object space into the image space side, wherein the object is assumed to be one of a passing object and a collision object, wherein the equation of motion is an equation wherein the motion model is of the object moving at a speed v along a path separated by a distance h from the at least one lens, and the motion model is approximately transformed via mapping onto the image space side of the photographing optical system, and the mathematical relationship $$Vim/Y^3 = \alpha \cdot (tc-\tau) \quad (1)$$

is used, where Y is an amount of discrepancy between the image plane and a focal point of the at least one lens, Vim is the image plane speed, tc is a detection time and $\alpha$ and $\tau$ are undetermined coefficients.

8. The focus adjustment apparatus of claim 7, wherein the equation of motion is an equation wherein the motion model is of the object approaching the at least one lens at a speed v, and the motion model is approximately transformed via mapping onto the image space side, and the mathematical relationship $$Yc = \beta \cdot |Vim|^{1/2} + Cp \quad (2)$$

is used, where Yc is the image plane position, Vim is the image plane speed and $\beta$ and $Cp$ are undetermined coefficients.

9. The focus adjustment apparatus of claim 7, wherein:

the statistical device performs regressive analysis for a plurality of equations of motion, and determines coefficients of at least one of the plurality of equations of motion by utilizing an equation of motion in which the contribution rate for regressive analysis is high.

10. A focus adjustment apparatus, comprising:

a focus detection device for detecting a defocus amount in an optical system including at least one lens;

a lens position detection device for detecting a position of the at least one lens;

an image plane position computation device for computing a position of an image plane of an object image based on the detected defocus amount and the detected lens position;

an image plane speed computation device for computing a speed of the image plane based on a change over time in the computed image plane position;

a statistical device for performing statistical analysis on a sample interval, wherein the sample interval is composed of the image plane position and the image plane speed, and the statistical device determines coefficients in an equation of motion that includes the image plane position and the image plane speed;

a predicting device for computing a predicted value of the image plane position based on a solution of the equation of motion including the determined coefficients; and a focus control device for controlling focus of the at least one lens based on the predicted value of the image plane position, wherein the statistical device performs regressive analysis for a plurality of equations of motion, and determines coefficients of at least one of the plurality of equations of motion by utilizing an equation of motion in which the contribution rate for regressive analysis is high, wherein the plurality of equations of motion includes $$Yc = \beta \cdot |Vim|^{1/2} + Cp \quad (2)$$

where Yc is an image plane position, Vim is an image plane speed and β and Cp are undetermined coefficients, and $$Vim/(Yc-Cp)^3 = \alpha \cdot (tc-\tau) \quad (3)$$

where Yc is the image plane position, Vim is the image plane speed, tc is a detection time and α and τ are undetermined coefficients, and the statistical device performs regressive analysis based on equation (2), and performs regressive analysis based on equation (3) following a drop in the contribution rate for this regressive analysis.

11. The focus adjustment apparatus of claim 7, wherein the predicting device computes the predicted value of the image plane position by making a linear approximation of the solution of the equation of motion, the equation of motion having coefficients determined by the statistical device.

12. The focus adjustment apparatus of claim 11, wherein the solution is a time dependent function.

13. A method for adjusting focus of an optical system including at least one lens, comprising:

detecting a defocus amount;

detecting a position of the at least one lens;

computing a position of an image plane of an object image based on the detected defocus amount and the detected lens position;

computing a speed of the image plane based on a change over time in the computed image plane position;

performing statistical analysis on a sample interval, wherein the sample interval is composed of the image plane position and the image plane speed, and coefficients are determined in an equation of motion that includes the image plane position and the image plane speed;

predicting a value of the image plane position based on a solution of the equation of motion including the determined coefficients; and controlling focus of the at least one lens based on the predicted value of the image plane position, wherein the equation of motion is an equation of motion for an image space side of the photographing optical system, and the method further comprises obtaining the equation through a mapping transformation of a motion model of an object in the object space into the image space side, wherein the object is assumed to be one of a passing object and a collision object, wherein the equation of motion is an equation wherein the motion model is of the object moving at a speed v along a path separated by a distance h from the at least one lens, and the step of obtaining the equation through the mapping transformation of the motion model of the object utilizes the mathematical relationship $$Vim/Y^3 = \alpha \cdot (tc-\tau) \quad (1)$$

where Y is an amount of discrepancy between the image plane and a focal point of the at least one lens, Vim is the image plane speed, tc is a detection time and α and τ are undetermined coefficients.

14. The method of claim 13, wherein the object is assumed to be a collision object.

15. The method of claim 14, wherein the equation of motion is an equation wherein the motion model is of the object approaching the at least one lens at a speed v, and the step of obtaining the equation through the mapping transformation of the motion model of the object utilizes the mathematical relationship $$Yc = \beta \cdot |Vim|^{1/2} + Cp \quad (2)$$

where Yc is the image plane position, Vim is the image plane speed and β and Cp are undetermined coefficients.

16. The method of claim 13, further comprising:

performing regressive analysis for a plurality of equations of motion; and determining coefficients of at least one of the plurality of equations of motion by utilizing an equation of motion in which the contribution rate for regressive analysis is high.

17. A method for adjusting focus of an optical system including at least one lens, comprising:

detecting a defocus amount;

detecting a position of the at least one lens;

computing a position of an image plane of an object image based on the detected defocus amount and the detected lens position;

computing a speed of the image plane based on a change over time in the computed image plane position;

performing statistical analysis on a sample interval, wherein the sample interval is composed of the image plane position and the image plane speed, and coefficients are determined in an equation of motion that includes the image plane position and the image plane speed;

predicting a value of the image plane position based on a solution of the equation of motion including the determined coefficients;

controlling focus of the at least one lens based on the predicted value of the image plane position;

performing regressive analysis for a plurality of equations of motion; and determining coefficients of at least one of the plurality of equations of motion by utilizing an equation of motion in which the contribution rate for regressive analysis is high, wherein the plurality of equations of motion includes $$Yc = \beta \cdot |Vim|^{1/2} + Cp \quad (2)$$

where Yc is an image plane position, Vim is an image plane speed and β and Cp are undetermined coefficients, and $$Vim/(Yc-Cp)^3 = \alpha \cdot (tc-\tau) \quad (3)$$

where Yc is the image plane position, Vim is the image plane speed, tc is a detection time and α and τ are undetermined coefficients, the method further comprising:

performing regressive analysis based on equation (2); and performing regressive analysis based on equation (3) following a drop in the contribution rate for this regressive analysis.

18. The method of claim 13, wherein the step of predicting the value of the image plane position comprises making a linear approximation of the solution of the equation of motion.

19. The method of claim 18, wherein the solution is a time dependent function.

20. The method of claim 13, further comprising determining whether the object is a collision object or a passing object.

* * * * *